US010235184B2

(12) United States Patent
Walker

(10) Patent No.: US 10,235,184 B2
(45) Date of Patent: Mar. 19, 2019

(54) BOOT LOADER FOR ACTIVE CABLE ASSEMBLIES

(71) Applicant: Corning Optical Communications LLC, Hickory, NC (US)

(72) Inventor: Richard Clayton Walker, Palo Alto, CA (US)

(73) Assignee: Corning Optical Communications LLC, Hickory, NC (US)

( * ) Notice: Subject to any disclaimer, the term of this patent is extended or adjusted under 35 U.S.C. 154(b) by 69 days.

(21) Appl. No.: 15/171,506

(22) Filed: Jun. 2, 2016

(65) Prior Publication Data

US 2016/0274921 A1    Sep. 22, 2016

Related U.S. Application Data

(63) Continuation of application No. PCT/US2014/068690, filed on Dec. 5, 2014.

(60) Provisional application No. 61/914,576, filed on Dec. 11, 2013.

(51) Int. Cl.
*G06F 1/28* (2006.01)
*H04B 3/28* (2006.01)
*H04B 3/30* (2006.01)
*H04L 25/03* (2006.01)
*G06F 9/4401* (2018.01)

(52) U.S. Cl.
CPC .............. *G06F 9/4408* (2013.01); *G06F 1/28* (2013.01); *H04B 3/28* (2013.01); *H04B 3/30* (2013.01); *H04L 25/03* (2013.01)

(58) Field of Classification Search
CPC ........... G06F 1/28; G06F 9/4408; H04B 3/28; H04B 3/30; H04L 25/03
See application file for complete search history.

(56) References Cited

U.S. PATENT DOCUMENTS

| 6,625,144 B1 * | 9/2003 | El-Batal ................ G06F 3/0607 370/364 |
| 7,840,742 B2 | 11/2010 | Berland et al. |
| 2007/2037472 | 10/2007 | Aronson et al. |

(Continued)

FOREIGN PATENT DOCUMENTS

JP    2002290490 A    10/2002

OTHER PUBLICATIONS

Patent Cooperation Treaty, International Search Report and Written Opinion for PCT/US2014/068690, dated Feb. 16, 2015, 9 pages.

*Primary Examiner* — Terrell S Johnson
(74) *Attorney, Agent, or Firm* — Michael E. Carroll, Jr.

(57) ABSTRACT

According to one embodiment, an active cable assembly may include a cable end, a data receiver, a controller characteristic circuit, and a controller. The data receiver, operable to receive a DC-balanced data signal, can be electrically coupled to a conductive input data line of the cable end. The controller characteristic circuit can be electrically coupled to the conductive input data line. The controller can be communicatively coupled to the data receiver. The controller may include a configurable communication port electrically coupled to the controller characteristic circuit, and memory for storing a boot loader. The controller can execute the boot loader to set the configurable communication port as an output for controller data signals and as an input for the controller data signals.

23 Claims, 8 Drawing Sheets

(56) References Cited

U.S. PATENT DOCUMENTS

2008/0250184 A1* 10/2008 Sheafor ................ G06F 13/385
                                                                710/306
2012/0054389 A1    3/2012 Lee
2013/0279860 A1   10/2013 Hung et al.
2013/0284493 A1* 10/2013 Horan .................... H01B 11/00
                                                               174/113 R

* cited by examiner

BOOT LOADER FOR ACTIVE CABLE ASSEMBLIES

PRIORITY APPLICATION

This application is a continuation of International Application No. PCT/US14/68690, filed on Dec. 5, 2014, which claims the benefit of priority under 35 U.S.C. § 119 of U.S. Provisional Application Ser. No. 61/914,576, filed on Dec. 11, 2013, the content of which is relied upon and incorporated herein by reference in its entirety.

BACKGROUND

Field

The present disclosure generally relates to apparatuses, and methods for facilitating debugging and reprogramming of active cable assemblies.

Technical Background

Active cables can be an attractive alternative to passive cables, especially as data rates increase. Active cables can utilize microprocessors and signal processing circuitry to improve data transmission performance compared to passive data cables. Active cables can be manufactured in high volumes and can be amenable to manufacturing in low-cost manufacturing centers. However, the low-cost centers can be isolated from the development team spatially and temporally. Such isolation can negatively impact yield and flow down of design improvements as changes are made to the product during development or over the product life cycle.

Accordingly, alternative active cable assemblies, as well as apparatuses, systems and methods for facilitating debugging and reprogramming of active cable assemblies, are desired.

SUMMARY

Embodiments of the present disclosure relate to active cable assemblies and, more specifically, active cable assemblies configured to enable communication between two or more electronic devices using a communications standard. Generally, the embodiments described herein enable fiber optic cable assemblies utilized in conjunction with, for instance, the USB 3.0 protocol to be reprogrammed and debugged via a communication link established with a controller of the active cable assembly. Embodiments also relate to methods and systems for facilitating communication with the controller of an active cable assembly.

According to one embodiment, an active cable assembly may include a cable end, a data receiver, a controller characteristic circuit, and a controller. The cable end may include a conductive input data line. The data receiver can be electrically coupled to the conductive input data line. The data receiver can be operable to receive a DC-balanced data signal. The controller characteristic circuit can be electrically coupled to the conductive input data line. The controller can be communicatively coupled to the data receiver. The controller may include a configurable communication port electrically coupled to the controller characteristic circuit, and memory for storing a boot loader. The controller can execute the boot loader to set the configurable communication port as an output for controller data signals. The boot loader can be executed to set the configurable communication port as an input for the controller data signals. The input can have a relatively high controller input impedance. The output can have a relatively low controller impedance with the relatively low controller impedance being lower than the relatively high controller input impedance According to another embodiment, a method of communicating with a controller of an active cable assembly may include setting a first configurable communication port and a second configurable communication port to outputs. The first configurable communication port can be communicatively coupled to a first input data line. The second configurable communication port can be communicatively coupled to a second input data line. The first input data line can be driven with the first configurable communication port and the second input data line can be driven with the second configurable communication port to a voltage of about 0 volts for a discharge time period. The first configurable communication port and the second configurable communication port can be set to inputs. A voltage can be detected automatically with the controller at the first configurable communication port, the second configurable communication port, or both. When the voltage is greater than a threshold voltage, the first configurable communication port can be set to an input, and the second configurable communication port can be set to an output. A controller data signal can be communicated from the second configurable communication port to the second input data line.

According to yet another embodiment, an active cable assembly may include a data receiver, a first isolation capacitor, a second isolation capacitor, a first input data line, a second input data line, a first isolation resistor, a second isolation resistor, and a controller. The data receiver can be operable to receive a DC-balanced data signal. The first isolation capacitor can be electrically coupled to the data receiver. The second isolation capacitor can be electrically coupled to the data receiver. The first input data line can be electrically coupled to the first isolation capacitor. The first isolation capacitor can be disposed in series between the first input data line and the data receiver. The second input data line can be electrically coupled to the second isolation capacitor. The second isolation capacitor can be disposed in series between the second input data line and the data receiver. The first isolation resistor can be electrically coupled to the first input data line and the first isolation capacitor. The second isolation resistor can be electrically coupled to the second input data line and the second isolation capacitor. The controller may include a first configurable communication port and a second configurable communication port. Each of the first configurable communication port and the second configurable communication port can be set to an input and an output for controller data signals. The first configurable communication port can be electrically coupled to the first isolation resistor. The second configurable communication port can be electrically coupled to the second isolation resistor.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Some aspects of the present disclosure are directed to communication with a controller of an active cable assembly to debug or reprogram the active cable assembly. It is noted that some active cable standards (e.g., Thunderbolt) have dedicated data lines for communication with the microprocessor, while other communication standards (e.g. USB 3.0) may make no provision for microprocessors, data lines for communication with microprocessors, or both. Embodiments of the active cable assemblies described herein can be utilized to retrofit microprocessor communication into the limited data lines of an application that makes no provision for microprocessor communication. In some embodiments, the high-speed AC-coupled data lines can be overloaded with a low-speed DC-coupled communication circuit. Although embodiments may be described within the context of the USB 3.0 standard, embodiments are not limited thereto. It is contemplated that embodiments may be implemented in past or future standards of USB, as well as other communication protocols and standards including, but not limited to, active cable standards.

Generally speaking, due to the high data rates of USB 3.0 (e.g., 5 Gb/s), the cable length of reasonably sized traditional passive electrical conductor cable assemblies is limited to about 3 meters or less due to skin and dielectric losses intrinsic to electrical conductors and dielectric materials. Further, conductor cables that are compatible with USB 3.0 are very bulky and put stress on the small connectors that are used on laptops and consumer devices such as camcorders. Because of these limitations, there may be interest in a fiber optic cable for use with USB 3.0. A fiber optic cable may be dramatically thinner, more flexible, easier to carry for portable use, and may put much less stress on the connectors used in small, handheld devices. Additionally, a fiber optic cable assembly may comprise cable lengths of 100 meter spans or more, allowing USB 3.0 to be used in markets such as video delivery and thin-client computing.

Figure 1:
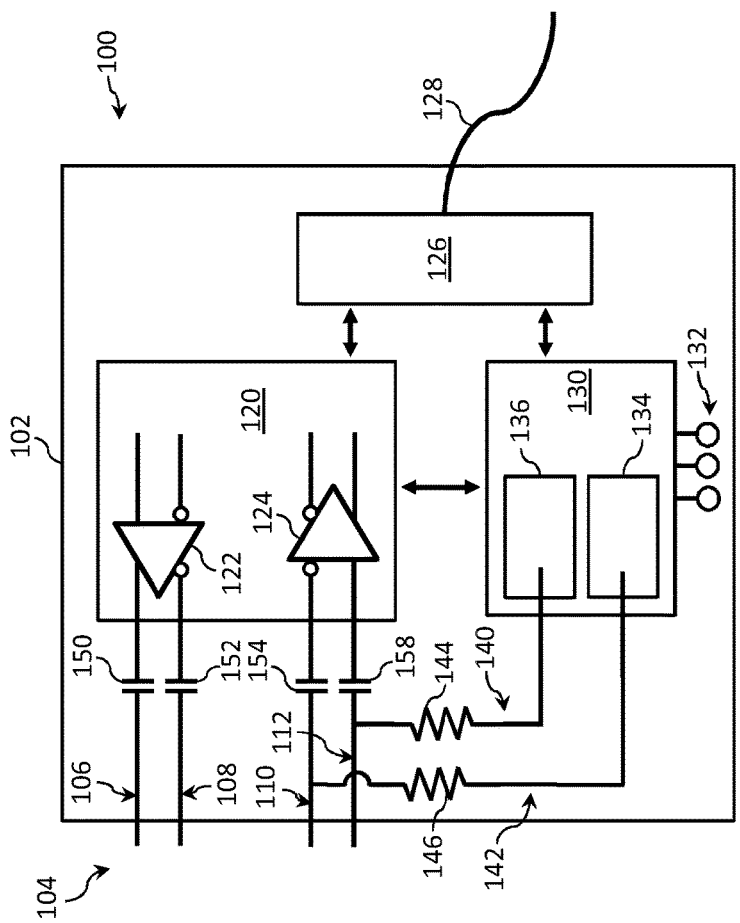
FIG. 1 schematically depicts one end of an active cable assembly according to one or more embodiments described and illustrated herein.

Referring now to FIG. 1, an embodiment of an active cable assembly 100 is schematically depicted. The active cable assembly 100 generally comprises a cable end 102, a communication circuit 120, an active coding circuit 126, and a controller 130. The cable end 102 of the active cable assembly 100 is configured to mate with a corresponding cable end to form a data link suitable for communicating data. The cable end 102 can comprise a connector having mechanical pins and alignment members such as, for example, a receptacle, a plug, or the like. The cable end 102 can comprise one or more cable end data lines 104 for communicatively coupling with a corresponding cable end to transmit data signals. It is noted that the term "signal," as used herein can mean a waveform (e.g., electrical, optical, magnetic, or electromagnetic), such as DC, AC, sinusoidal-wave, triangular-wave, square-wave, and the like. It is further more noted that the phrase "communicatively coupled," as used herein, can mean that components are capable of exchanging signals with one another such as, for example, electrical signals via a conductive medium, electromagnetic signals via air, optical signals via optical waveguides, or the like.

In some embodiments, the one or more cable end data lines 104 can comprise a first output data line 106 and a second output data line 108 for communicating data signals from the communication circuit 120. The one or more cable end data lines 104 can further comprise a first input data line 110 and a second input data line 112 for communicating data signals to the communication circuit 120. Each of the first output data line 106, the second output data line 108, the first input data line 110 and the second input data line 112 can be electrically conductive or be formed from electrically conductive materials such as, for example, copper or the like. It is noted that the one or more cable end data lines 104 can include any number of data lines. Indeed, it is contemplated that the embodiments described herein can be extended to include the number of data lines needed for compatibility with any defined communication protocol.

The communication circuit 120 can be configured to communicate dc-balanced signals via the one or more cable end data lines 104 of the cable end 102. In some embodiments, the communication circuit 120 can be configured to communicate high speed data signals according to the USB 3.0 standard. Accordingly, the communication circuit 120 can be operable to communicate about 5 Gigabit per second signals or greater, which can have voltage swings of about +/−1 volt. The communication circuit 120 can comprise a data transmitter 122 for transmitting data to the one or more cable end data lines 104. The communication circuit 120 can further comprise a data receiver 124 for receiving data from the one or more cable end data lines 104 and communicating the received data to the active coding circuit 126.

Referring still to FIG. 1, the active coding circuit 126 can be configured to process data signals prior to transmitting the data signals through transmission data lines 128 to another cable end or device. In some embodiments, the active coding circuit 126 can comprise drivers, equalizers and coding means to process a signal for longer transmission distances. Additionally, the active coding circuit 126 can comprise drivers, equalizers and coding means to decode received signals for transmission via the one or more data lines according to a desired communication protocol.

According to the embodiments described herein, the active coding circuit 126 can be operable to process electrical signals into electrical signals for extended transmission. For example, the active coding circuit 126 can filter or amplify a received electrical signal. Alternatively or additionally, the active coding circuit 126 can be configured to transform electrical signals into optical signals, or optical signals into electrical signals. Accordingly, the active coding circuit 126 can comprise optical devices such as, for example, lasers, photodiodes, optical couplings, or the like. Moreover, it is noted that the transmission data lines 128 can comprise conductive data lines, optical data lines, or a combination thereof.

As is noted above, the active cable assembly 100 can comprise a controller 130. The controller 130 can be operable to manage the exchange of data signals via the communication circuit 120 and the active coding circuit 126. Specifically, the controller 130 can execute machine readable instructions to automatically operate the communication circuit 120 and the active coding circuit 126 to implement any of the methods described herein automatically. The controller 130 can comprise a processor, an integrated circuit, a microchip, or any other computing device capable of executing machine readable instructions. Memory for storing machine readable instructions can be communicatively coupled to the one or more processors. The memory can comprise EPROM, RAM, ROM, a flash memory, a hard drive, or any non-transitory device capable of storing machine readable instructions. The memory of the controller 130 can comprise an algorithm written in any programming language of any generation (e.g., 1 GL, 2 GL, 3 GL, 4 GL, or 5 GL) such as, e.g., machine language that may be directly executed by the processor, or assembly language, object-oriented programming (OOP), scripting languages, microcode, etc., that may be compiled or assembled into machine readable instructions and stored on a machine readable medium.

The controller 130 can be programmed to handle various maintenance and setup functions for the communication circuit 120, the active coding circuit 126, the controller 130, or combinations thereof. For example, the controller 130 can be configured to provide data accessible to the controller, such as, for example, diagnostic information, parameter values, or the like. Moreover, the controller 130 can be commanded to perform certain functions or operate in various preprogrammed modes such as, for example, debugging mode or the like. Additionally, the controller 130 can be reprogrammed to, for example, update the firmware or to change operational parameters.

In some embodiments, the controller 130 can comprise communication pads 132 that can exchange signals to perform any of the maintenance and setup functions described herein. For example, the controller can be coupled to a printed circuit board and the communication pads 132 can be conductive pads fabricated on the printed circuit board. A communication fixture can be communicatively coupled to the communication pads 132 via spring-loaded "pogo" pins. Accordingly, the hardware programming ports of a processor of the controller 130 can be accessed and the memory associated with the controller can be accessed or rewritten. During the manufacturing process, the communication pads 132 can become inaccessible (e.g., covered by a housing). Accordingly, the communication pads 132 may be desirable for use when the circuit board is exposed.

The controller 130 can comprise one or more configurable communication ports that can be configured as an output for transmitting data signals from the controller 130 and as an input for inputting data signals to the controller 130. The configurable communication ports can be operable to communicate controller data signals according to a processor communication protocol such as, for example, RS-232, Serial Peripheral Interface (SPI), Inter-Integrated Circuit ($I^2C$), alternative serial communication standards, or any other suitable communication standard. In some embodiments, the controller 130 can comprise a first configurable communication port 134 and a second configurable communication port 136. It is noted that, while the embodiments depicted in FIGS. 1-6 the controller comprises the first configurable communication port 134 and the second configurable communication port 136, the embodiments of the controller 130 described herein can comprise only one configurable communication port or more than two configurable communication ports if desired.

Figure 2A:
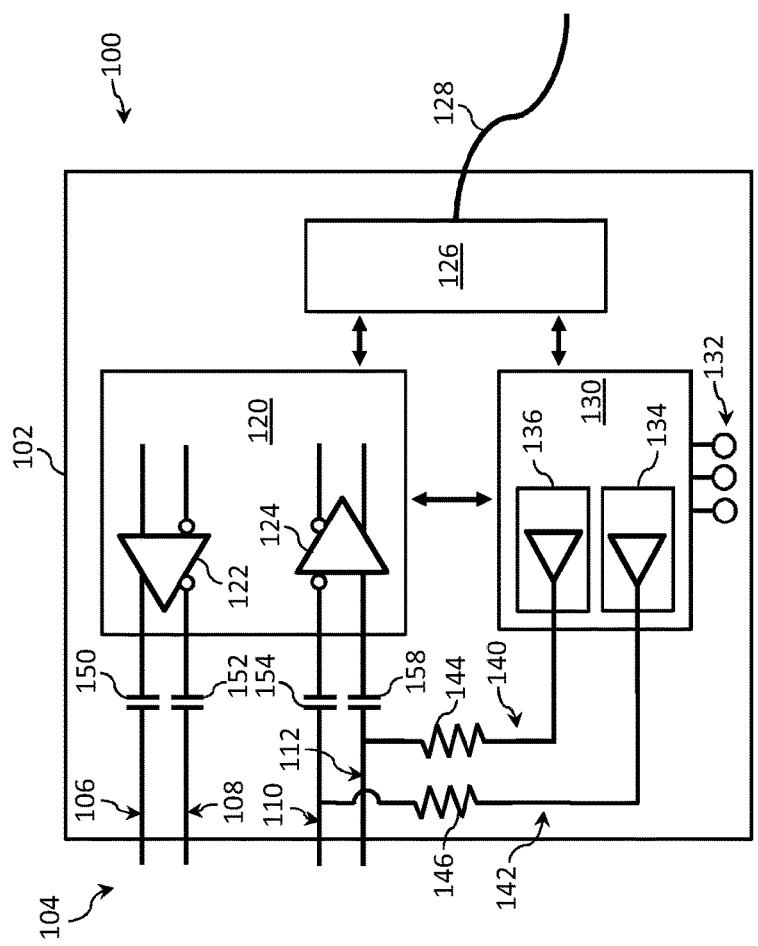
FIGS. 2A-2C schematically depict various communication modes of configurable communication ports of the active cable assembly depicted in FIG. 1 according to one or more embodiments described and illustrated herein.
Figure 2B:
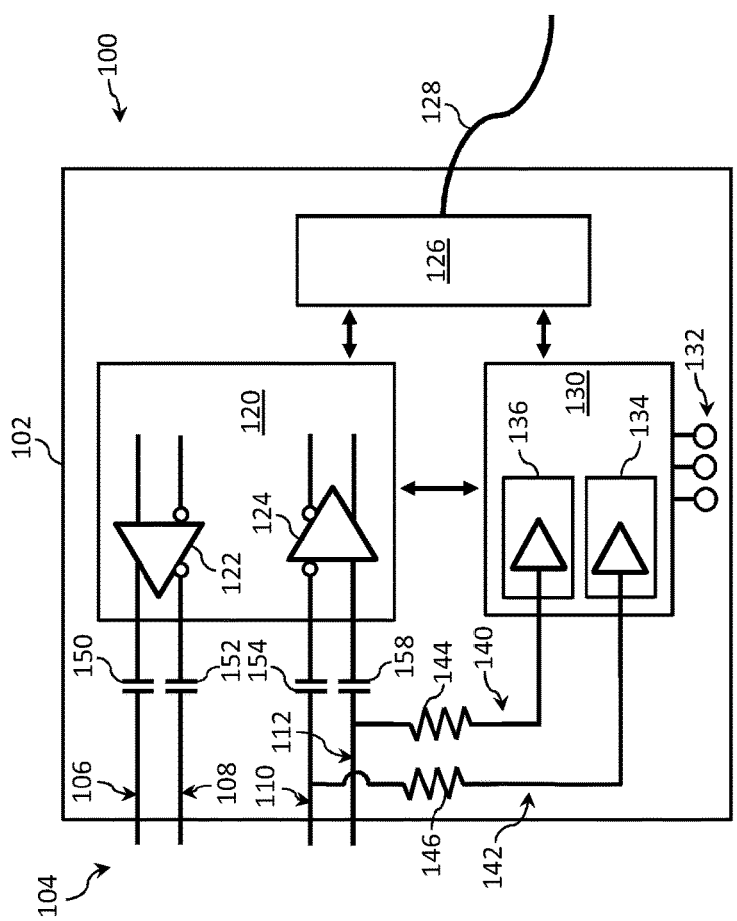
Figure 2C:
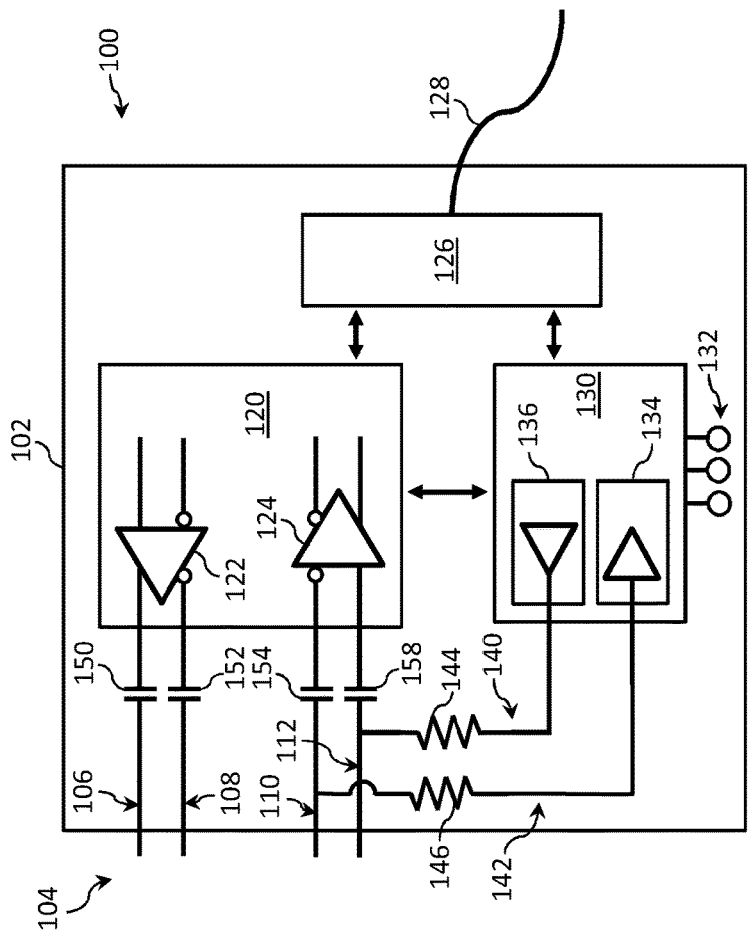

Referring collectively to FIGS. 1-2C, the controller 130 can execute machine readable instructions to cause each of the first configurable communication port 134 and the second configurable communication port 136 to operate as an input, or an output. When operating as an input, the configurable communication port can have a relatively high controller input impedance such as, for example, greater than about 1 mega-ohm in one embodiment, or greater than about 5 mega-ohm in another embodiment. Referring to FIG. 2A, each of the first configurable communication port 134 and the second configurable communication port 136 can operate as an output. When operating as an output, the configurable communication port can have a relatively low controller impedance that is lower than the relatively high controller input impedance. Referring to FIG. 2B, each of the first configurable communication port 134 and the second configurable communication port 136 can operate as an input. Referring to FIG. 2C, the first configurable communication port 134 can operate as an input and the second configurable communication port 136 can operate as an output. Accordingly, the controller 130 can transmit and receive controller data signals contemporaneously. In embodiments, with only one configurable communication port, the controller 130 can transmit and receive controller data signals over the one configurable communication port by alternating between the one configurable communication port input and output.

Figure 3:
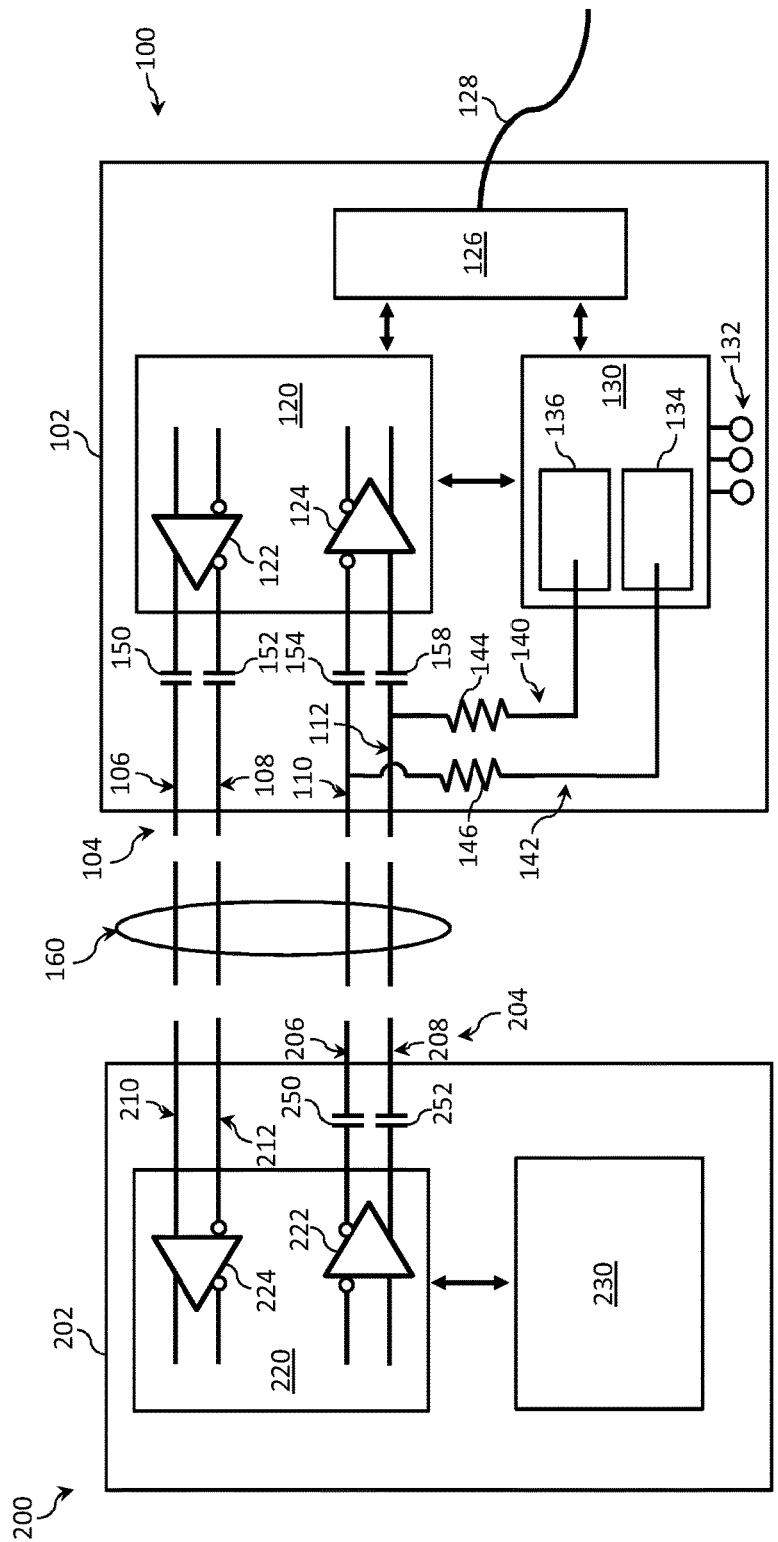
FIG. 3 schematically depicts a system having an active optical cable assembly coupled to a host device according to one or more embodiments described and illustrated herein.

As is noted above, the embodiments described herein can be configured to communicate data signals according to the USB 3.0 standard. Referring to FIG. 3, the communication circuit 120 can be communicatively coupled to the controller 130 and the active coding circuit 126. The controller 130 can also be communicatively coupled to the active coding circuit 126, which can be communicatively coupled to the transmission data lines 128. The first output data line 106 can be electrically coupled in series to a transmit capacitor 150. The transmit capacitor 150 can also be electrically coupled in series to the data transmitter 122. The second output data line 108 can be electrically coupled in series to a transmit capacitor 152. The transmit capacitor 152 can also be electrically coupled in series to the data transmitter 122. It is noted that, the phrase "electrically coupled," as used herein, can mean to provide a conductive medium between one object and another object for the transmission of electrical signals via the conductive medium.

In addition to compliance with the desired communication standard, the embodiments described herein can comprise components configured to isolate the data receiver 124 from the controller data signals. For example, in one embodiment, the first input data line 110 can be electrically coupled to an isolation capacitor 154. The isolation capacitor 154 can be electrically coupled to the data receiver 124. The second input data line 112 can be electrically coupled to an isolation capacitor 158. The isolation capacitor 158 can be electrically coupled to the data receiver 124.

The active cable assembly 100 can comprise one or more control characteristic circuits for communicating with the controller 130. In some embodiments, the first input data line 110 can be electrically coupled to a first control characteristic circuit 142. The first control characteristic circuit 142 can be electrically coupled in series with the first configurable communication port 134. The second input data line 112 can be electrically coupled to a second control characteristic circuit 140. The second control characteristic circuit 140 can be electrically coupled in series with the second configurable communication port 136.

Referring still to FIG. 3, the active cable assembly 100 can be connected to a host device 200 to communicate data signals. The host device 200 generally comprises a cable end 202, a communication circuit 220, and a controller 230 communicatively coupled to the communication circuit 220. The cable end 202 can comprise one or more cable end lines 204 comprising a first output data line 206 and a second output data line 208 for communicating data signals from the communication circuit 220 and a first input data line 210 and a second input data line 212 for communicating data signals to the communication circuit 220.

The host device 200 can comprise a communication circuit 220 for communicating according to the communication protocol of the active cable assembly and a controller 230 communicatively coupled to the communication circuit 220. The communication circuit 220 can comprise a data receiver 224 and a data transmitter 222. The data receiver 224 can be electrically coupled to the first input data line 210 and the second input data line 212. The data transmitter 222 can be electrically coupled in series to a transmit capacitor 250. The transmit capacitor 250 can also be electrically coupled in series to the first output data line 206. The data transmitter 222 can be electrically coupled to in series to a transmit capacitor 252. The transmit capacitor 252 can also be electrically coupled in series to the second output data line 208.

The cable end 202 of the host device 200 is configured to mate with the cable end 102 of the active cable assembly 100 to form a data link for communicating data between the host device 200 and the active cable assembly 100. Specifically, an electrical connection 160 can be formed by placing corresponding data lines of the one or more cable end lines 204 of the host device 200 in electrical contact with the one or more cable end data lines 104 of the active cable assembly 100.

Figure 4:
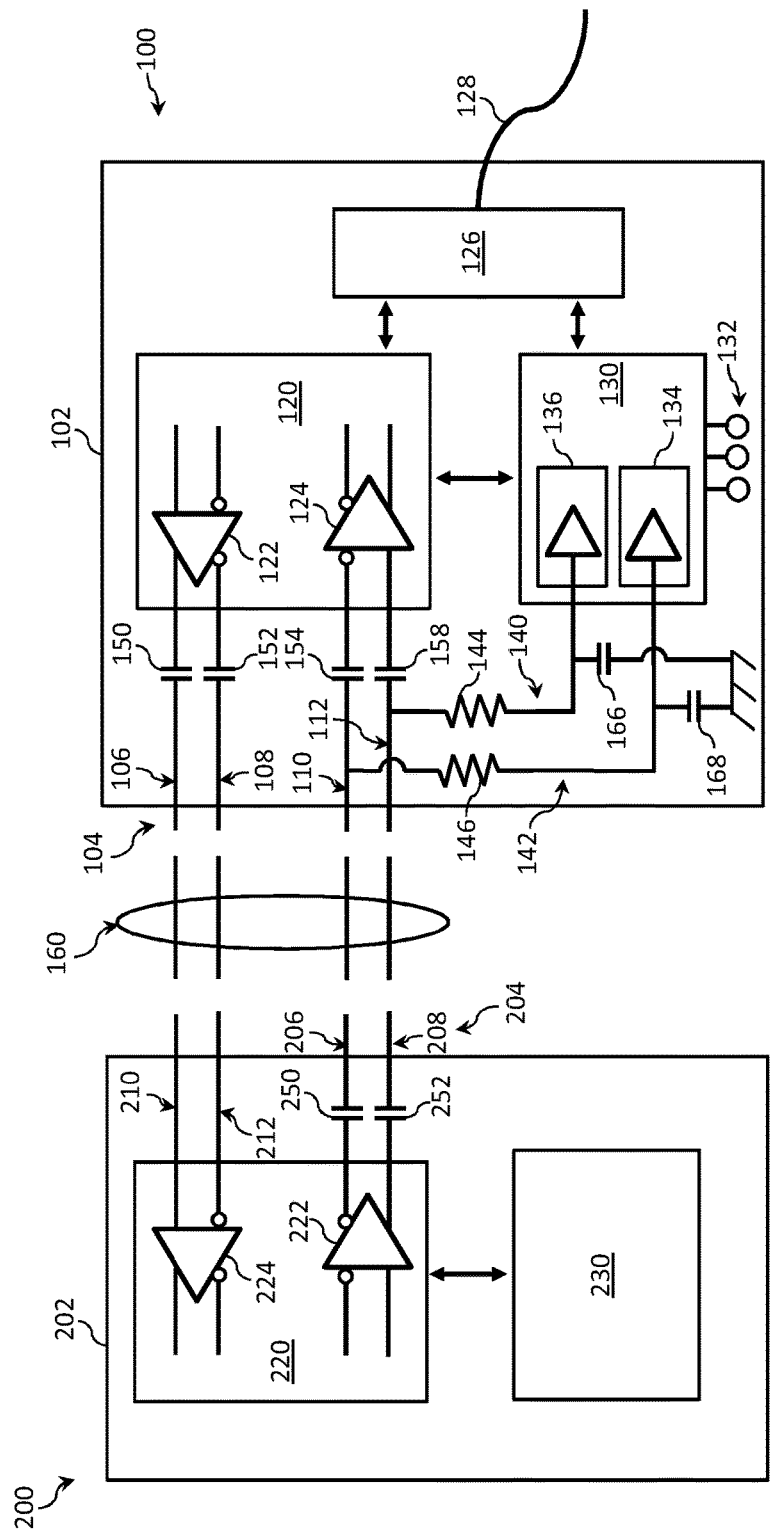
FIG. 4 schematically depicts the system of FIG. 3 comprising an isolation scheme for a communication circuit of an active optical assembly according to one or more embodiments described and illustrated herein.

Referring now to FIG. 4, the active cable assembly 100 can operate in a "mission mode" as high speed data is received by the data receiver 124. During "mission mode," the first configurable communication port 134 and the second configurable communication port 136 can be configured as inputs. When configured as inputs, the first configurable communication port 134 and the second configurable communication port 136 can have a relatively high controller input impedance to eliminate disturbance of the high speed data transmission. Each of the first control characteristic circuit 142 and the second control characteristic circuit 140 can have parasitic inductance and capacitance (e.g., due to conductive traces or wiring) that operate as a source of reflections that can corrupt the high speed data signals. The parasitic capacitance can be modeled as parasitic capacitor 168 electrically connected between ground and the first control characteristic circuit 142 and parasitic capacitor 168 electrically connected between ground and the second control characteristic circuit 140.

To mitigate signal degradation, the first control characteristic circuit 142 can comprise an isolation resistor 146 electrically coupled to each of the first input data line 110 and the first configurable communication port 134. Additionally, the second control characteristic circuit 140 can comprise an isolation resistor 144 electrically coupled to each of the second input data line 112 and the second configurable communication port 136. The resistance of each of the isolation resistor 146 and the isolation resistor 144 can be set at a value high enough to isolate the first configurable communication port 134 and the second configurable communication port 136 from significantly disturbing the high speed data signals. In order to set the resistance of the isolation resistor 146, the impedance of the first control characteristic circuit 142, the parasitic capacitor 168, and the input impedance of the first configurable communication port 134 can be considered. Similarly, the impedance of the second control characteristic circuit 140, the parasitic capacitor 166, and the input impedance of the second configurable communication port 136 can be considered to set the resistance of the isolation resistor 144. In some embodiments, the resistance value of each of the isolation resistor 144 and the isolation resistor 146 can be greater than or equal to about 500 ohms, such as, for example, greater than or equal to about 1,000 ohms in another embodiment. Alternatively or additionally, the isolation resistor 146 and the isolation resistor 144 can be physically laid out on the printed circuit board very close to the first input data line 110 and the second input data line 112, respectively, to minimize any transmission line stubs or capacitance on the high-speed side of the resistor.

Figure 5:
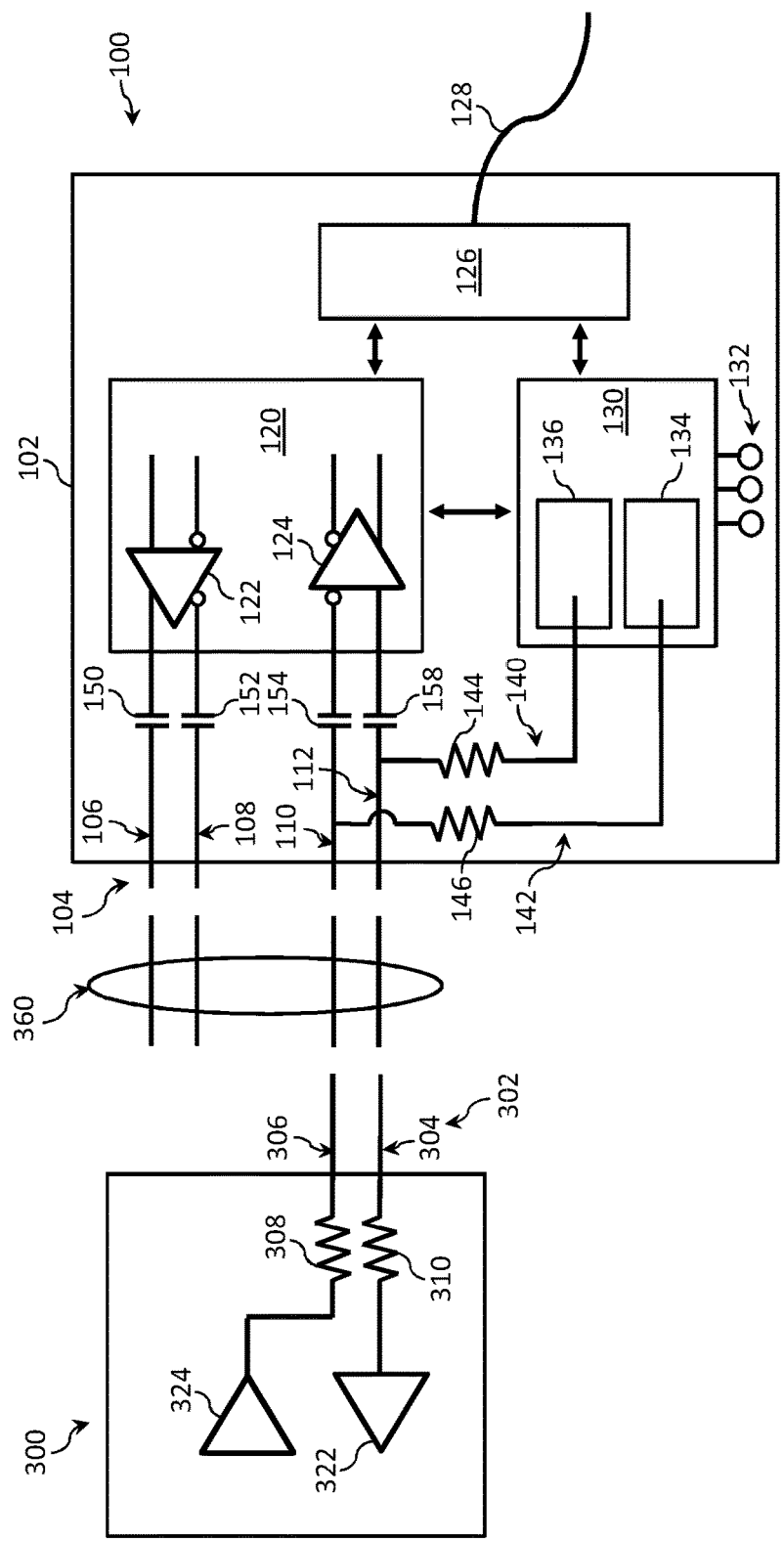
FIG. 5 schematically depicts a system having an active optical cable assembly coupled to a programming fixture according to one or more embodiments described and illustrated herein.

Referring now to FIG. 5, the active cable assembly 100 can operate in a "controller communication mode" while the configurable communication ports 134, 136 communicate controller data signals via the one or more cable end data lines 104. In some embodiments, the active cable assembly 100 can be connected to a programming fixture 300 to communicate controller data signals. The programming fixture 300 can comprises one or more data lines 302 for exchanging data with the controller 130 of the active cable assembly 100. In one embodiment, the one or more data lines 302 can comprise an input data line 304 and an output data line 306. The programming fixture 300 can further comprise a data receiver 322 for receiving controller data signals from the controller 130 and a data transmitter 324 for transmitting controller data signals to the controller 130. The data receiver 322 can be electrically coupled to a fixture resistor 310, which is electrically coupled to the input data line 304. The data transmitter 324 can be electrically coupled to a fixture resistor 308, which is electrically coupled to the output data line 306.

Figure 6:
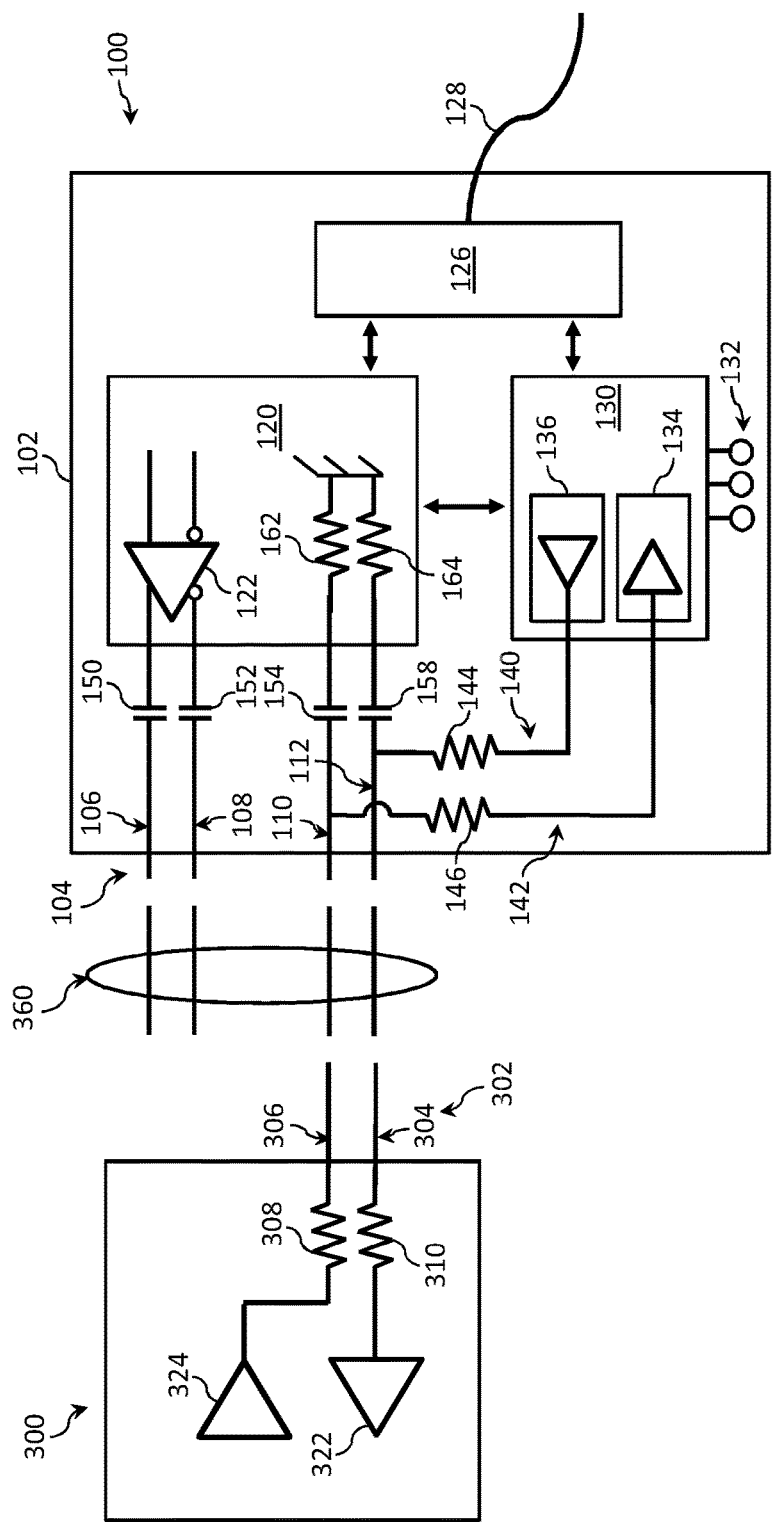
FIG. 6 schematically depicts the system of FIG. 5 comprising an isolation scheme for a communication circuit of an active optical assembly according to one or more embodiments described and illustrated herein.

Referring collectively to FIGS. 5 and 6, an electrical connection 360 can be formed by placing corresponding data lines of the one or more data lines 302 of the programming fixture 300 in electrical contact with the one or more cable end data lines 104 of the active cable assembly 100. Specifically, the first input data line 110 can be configured to receive controller data signals from the output data line 306. The input data line 304 can be configured to receive controller data from the second input data line 112. Accordingly, the first configurable communication port 134 can operate as an input for receiving controller data signals and the second configurable communication port 136 can operate as an output for transmitting controller data signals from the controller 130.

While the active cable assembly 100 is operating in the "controller communication mode," the communication circuit 120 can be isolated from the controller data signals. In some embodiments, the controller data signals can be distinct from the high speed data signals. In one embodiment, the controller data signals can have a lower frequency than the high speed data signals. Alternatively or additionally, the controller data signal can have a larger voltage swing than the high speed data signal. Specifically, in embodiments where the controller data signal uses the RS-232 standard, programming pulses can be from about 3 volts to about 5 volts. In embodiments, where the high speed data signal follows the USB 3.0 standard, the high speed data signal can have be a DC-balanced data stream with voltage of range of about 5 volts−0.55 volts to about 5 volts+about 0.25 volts.

In some embodiments, the first control characteristic circuit 142 and the isolation capacitor 154 can cooperate to isolate the communication circuit 120 from controller data signals. As depicted in FIG. 6, the input resistor 162 and input resistor 164 models the effect of the input resistance of the data receiver 124. Accordingly, the isolation capacitor 154 can be electrically coupled to ground by the input resistor 162 of the data receiver 124. Accordingly, a single order high pass filter can be formed at the input resistor 162 (i.e., the data receiver 124) and a single order low pass filter can be formed at the first configurable communication port 134. Alternatively or additionally, a voltage dividing action can be achieved by the isolation resistor 146 and the input resistor 162 (i.e., the data receiver 124), i.e., the isolation resistor 146 can have larger resistance than the input resistor 162 to reduce current input to the communication circuit 120. Accordingly, the controller data signals can be attenuated both the high pass filtering of isolation capacitor 154 and the voltage dividing action before the attenuated signal can reach the communication circuit 120. Additionally, the data receiver 124 can include anti-static clamp diodes to protect sensitive input gates. Accordingly, even if the attenuated signal were to exceed the safe level, the clamp diodes could provide secondary protection as long as the peak current is limited to non-damaging levels.

Referring collectively to FIGS. 5 and 6, it is noted that in some embodiments the input resistance of the data receiver 124 can be considered symmetric at each of the inputs. Accordingly, the arrangement described immediately above can be applied to the second control characteristic circuit 140 and the isolation capacitor 158 to isolate the communication circuit 120 from controller data signals.

Referring collectively to FIGS. 4 and 6, each of the input resistor 162 and input resistor 164 can have an effective input resistance of about 50 ohms. Accordingly, the isolation resistors 146, 144 can be set to about 1,000 ohm and the isolation capacitors 154, 158 can be set to about 0.1 uF, to isolate the communication circuit 120 from a controller data signals limited to about 1K baud. Alternatively or additionally, the capacitance of the isolation capacitors 154, 158 can be greater than the transmit capacitors 250, 252. In further embodiments, the value of the isolation capacitors 154, 158 can be greater than or equal to about double the capacitance of the transmit capacitors 250, 252 such as, for example, greater than or equal to about four times the capacitance of the transmit capacitors 250, 252 in still a further embodiment. In some embodiments, the transmit capacitors 250, 252 and the transmit capacitors 150, 152 can have substantially similar values, the transmit capacitors 250, 252 and the transmit capacitors 150, 152 can be configured to follow the same communication standard. For example, when following USB 3.0, each of the transmit capacitors 150, 152, 250, 252 can have capacitances of about 200 pF to about 1,000 pF. Accordingly, the capacitance of the isolation capacitors 154, 158 can be greater than the transmit capacitors 150, 152. Moreover, the value of the isolation capacitors 154, 158 can be greater than or equal to about double the capacitance of the transmit capacitors 150, 152 such as, for example, greater than or equal to about four times the capacitance of the transmit capacitors 150, 152 in still a further embodiment.

Referring collectively to FIGS. 2A to 2C, embodiments of the active cable assembly 100 can be configured to automatically transition between the "mission mode" and the "controller communication mode." Specifically, the memory of the controller 130 can comprise machine readable instructions for implementing a boot loader, i.e., each time the controller is booted or powered on from an unpowered state, the boot loader can be executed. In one embodiment, the boot loader can cause the controller 130 to search for the presence of the programming fixture 300 (FIGS. 3 and 4). If programming fixture 300 is detected, then the controller 130 can enter "controller communication mode." If programming fixture 300 is not detected, then the controller 130 can enter "mission mode."

Referring to FIG. 2A, the controller 130 can begin the boot loader by setting the first configurable communication port 134 and the second configurable communication port 136 to outputs. As outputs, the first configurable communication port 134 and the second configurable communication port 136 can have a relatively low controller impedance. The controller 130 can then cause the first configurable communication port 134 and the second configurable communication port 136 to actively drive the first input data line 110 and the second input data line 112 to an initial voltage for an initialization time period. In some embodiments, the initial voltage can be sufficiently low to discharge any voltage on the isolation capacitor 154 and the isolation capacitor 158 to about 0 volts within the initialization time period. For example, the initial voltage can be set to about 0 volts to achieve an initialization time period of about 10 milliseconds. In some embodiments, the initial voltage and the initialization time period can be set to discharge any possible voltage on transmit capacitor 250 and transmit capacitor 252 (FIGS. 3 and 4). This may be required if the controller 130 has yet to determine if the active cable assembly 100 is connected to the programming fixture 300 or the host device 200. Alternatively or additionally, the initialization voltage can be set to any voltage distinguishable from a charge voltage. Accordingly, the initialization voltage can be about 0 volts, a negative voltage value, or a positive voltage value.

Referring now to FIG. 2B, the controller 130 can set the first configurable communication port 134 and the second configurable communication port 136 to inputs. As inputs, the first configurable communication port 134 and the second configurable communication port 136 can have a relatively high controller input impedance. The controller 130 can wait for a predetermined time period. The predetermined time period should be long enough for the programming fixture 300 (if present) to charge the first input data line 110, the second input data line 112, or both to the charge voltage. Additionally, the predetermined time period should be short enough such that the leakage of each of the isolation capacitor 154 and the isolation capacitor 158 will not cause appreciable drift during the measurement time. Both the discharge time period and the predetermined time period should be long enough to allow several time-constants to ensure proper equilibration of the voltages, yet not too long to be subject to drift.

Referring now to FIG. 2C, after waiting the predetermined time period, the voltage of the first input data line 110, the second input data line 112, or both can be sensed. The sensed voltage, which should be equal to about the charge voltage (e.g., about 3 volts) when the programming fixture 300 is present, can be compared to a communication voltage range. If the sensed voltage is within the communication voltage range the controller 130 can consider the programming fixture 300 as present. In some embodiments, the communication voltage range can be set as a range of voltages greater than a threshold voltage (e.g., about 1.5 volts). In further embodiments, the communication voltage range can be set as a range of voltages less than a threshold voltage. In still further embodiments, the communication voltage range can be set as a range of voltages that overlaps a threshold voltage, i.e., the range extends from a minimum voltage less than the threshold voltage to a maximum voltage that is greater than the threshold voltage.

When the programming fixture 300 is determined as present, the controller can enter the "controller communication mode." For example, the first configurable communication port 134 can be set to an input and the second configurable communication port 136 can be set to an output. As is noted above, when in "controller communication mode" the controller 130 can be reprogrammed or enter into a debugging mode, i.e., the current firmware can be tested systematically while the controller 130 provide parameter details. For example, the controller 130 can provide internal information of the active coding circuit such as, for example, a set of data indicative of the health of the laser, the photodiode, and the integrity and loss of all the optical couplings. Alternatively or additionally, the controller 130 can be directed to perform diagnostic actions such as, for example, a sweep of laser drive settings and detection of the photo current at the associated receiver.

Referring again to FIG. 2B, if the sensed voltage is not within than the communication voltage range, the controller 130 can consider the programming fixture 300 as absent. Accordingly, the controller can enter the "mission mode" and the controller 130 can isolate the communication circuit 120 from the first configurable communication port 134 and the second configurable communication port 136. For example, the first configurable communication port 134 and the second configurable communication port 136 can be set to inputs.

It should now be understood that embodiments described herein are directed to apparatuses and methods for communication with a microprocessor of an active cable assembly after the microprocessor has been sealed within a cable housing. Specifically, the high-speed AC-coupled data lines can cooperate with the resistors and capacitors, described herein, to form a resistive bias tee communication circuit. Accordingly, modification of the firmware of the active cable assembly can be performed post-manufacturing. Such external programming can reduce product returns and improve manufacturing yields.

The boot loading techniques described herein enable the multi-purposing of the high speed conductors of cables designed to be compliant with standards that do not contemplate active cable implementations. Accordingly, the advantages of a microprocessor communication channel can be applied to high-volume consumer cables that otherwise would not support firmware upgrades. Moreover, differences between the prototype development stage, where development is typically done on large-form-factor evaluation boards with non-destructive access to hardware programming ports, and the final product can be evaluated and quantified. A further advantage is that properties of the final product cable, which cannot otherwise be determined, can be evaluated and quantified. This information can be fed back into the design phase to improve yield.

It is noted that terms like "typically," when utilized herein, are not intended to limit the scope of the claims or to imply that certain features are critical, essential, or even important to the structure or function of the embodiment. Rather, these terms are merely intended to highlight alternative or additional features that may or may not be utilized in a particular embodiment of the disclosure.

For the purposes of describing and defining the concepts it is noted that the terms "approximately" and "about" are utilized herein to represent the inherent degree of uncertainty that may be attributed to any quantitative comparison, value, measurement, or other representation.

What is claimed is:

1. An active cable assembly comprising:
a cable end comprising a conductive input data line;
a data receiver electrically coupled to the conductive input data line, wherein the data receiver is operable to receive a DC-balanced data signal;
a controller characteristic circuit electrically coupled to the conductive input data line; and
a controller communicatively coupled to the data receiver, the controller comprising a configurable communication port electrically coupled to the controller characteristic circuit, and memory for storing a boot loader, wherein the controller executes the boot loader to:
set the configurable communication port as an input for the controller data signals, the input having a high controller input impedance; and
set the configurable communication port as an output for controller data signals, the output having a low controller impedance that is lower than the high controller input impedance.

2. The active cable assembly as claimed in claim 1, further comprising an isolation capacitor electrically coupled to the controller characteristic circuit, the conductive input data line, and the data receiver, wherein the isolation capacitor is in series with the data receiver and located between the data receiver and the conductive input data line.

3. The active cable assembly as claimed in claim 1, wherein the controller characteristic circuit comprises an isolation resistance.

4. The active cable assembly as claimed in claim 1, wherein the controller executes the boot loader to selectively operate in a control communication mode or a mission mode based at least in part upon a voltage level sensed by the configurable communication port.

5. The active cable assembly as claimed in claim 4, wherein the configurable communication port transmits the controller data signals to the conductive input data line, while the controller operates in the control communication mode.

6. The active cable assembly as claimed in claim 5, wherein the controller data signals correspond to diagnostic information, parameter values, or both.

7. The active cable assembly as claimed in claim 4, wherein the controller operates in the control communication mode when the voltage level is within a communication voltage range.

8. The active cable assembly as claimed in claim 7, wherein the voltage level is sensed a predetermined time period from setting of the configurable communication port as the input.

9. The active cable assembly as claimed in claim 1, wherein the DC-balanced data signal has a higher frequency than the controller data signals.

10. A method of communicating with a controller of an active cable assembly, the method comprising:
    setting a first configurable communication port and a second configurable communication port to outputs, wherein the first configurable communication port is communicatively coupled to a first input data line and the second configurable communication port is communicatively coupled to a second input data line;
    driving the first input data line, with the first configurable communication port, and the second input data line, with the second configurable communication port, to 0 volts for a discharge time period;
    setting the first configurable communication port and the second configurable communication port to inputs;
    detecting, at the first configurable communication port, the second configurable communication port, or both, a voltage automatically with the controller;
    setting the first configurable communication port to an input, and the second configurable communication port to an output, when the voltage is greater than a threshold voltage; and
    communicating a controller data signal from the second configurable communication port to the second input data line.

11. The method as claimed in claim 10, further comprising:
    receiving a DC-balanced data signal with the first input data line, with the first configurable communication port, and the second input data line.

12. The method as claimed in claim 10, further comprising:
    receiving an input controller data signal with the first input data line; and
    communicating the input controller data signal from the first input data line to the first configurable communication port.

13. The method as claimed in claim 12, wherein the input controller data signal corresponds to program code, debugging code, or a combination thereof.

14. The method as claimed in claim 10, wherein the voltage is detected a predetermined time period after the first configurable communication port and the second configurable communication port are set to inputs.

15. The method as claimed in claim 14, wherein the first configurable communication port and the second configurable communication port are set to inputs after the predetermined time period has elapsed.

16. The method as claimed in claim 10, wherein the controller data signal corresponds to diagnostic information, parameter values, or a combination thereof.

17. The method as claimed in claim 10, wherein the voltage is provided by a programming fixture connected to the active cable assembly.

18. An active cable assembly comprising:
    a cable end comprising a conductive input data line;
    a data receiver electrically coupled to the conductive input data line, wherein the data receiver is operable to receive a DC-balanced data signal;
    a controller characteristic circuit electrically coupled to the conductive input data line; and
    a controller communicatively coupled to the data receiver, the controller comprising a configurable communication port electrically coupled to the controller characteristic circuit, and memory for storing a boot loader, wherein the controller executes the boot loader to:
        set the configurable communication port as an output for controller data signals, the output having a low controller impedance that is lower than the high controller input impedance;
        control the configurable communication port to drive the conductive input data line with an initial voltage;
        set the configurable communication port as an input for the controller data signals, the input having a high controller input impedance; and
        control the configurable communication port to sense a voltage level on the conductive input data line after a predetermined period of time after setting the configurable communication port as an input.

19. The active cable assembly as claimed in claim 18, further comprising an isolation capacitor electrically coupled to the controller characteristic circuit, the conductive input data line, and the data receiver, wherein the isolation capacitor is in series with the data receiver and located between the data receiver and the conductive input data line.

20. The active cable assembly as claimed in claim 18, wherein the controller characteristic circuit comprises an isolation resistance.

21. The active cable assembly as claimed in claim 18, wherein the controller executes the boot loader to selectively operate in a control communication mode or a mission mode based at least in part upon the voltage level sensed by the configurable communication port.

22. The active cable assembly as claimed in claim 21, wherein the configurable communication port transmits the controller data signals to the conductive input data line, while the controller operates in the control communication mode.

23. The active cable assembly as claimed in claim 21, wherein the controller operates in the control communication mode when the voltage level is within a communication voltage range.

* * * * *